United States Patent
Cucchi

(10) Patent No.: US 12,202,048 B2
(45) Date of Patent: Jan. 21, 2025

(54) CENTERING DEVICE FOR SUPPLYING BARS TO MACHINE TOOLS

(71) Applicant: CUCCHI GIOVANNI & C. S.R.L., Bussero (IT)

(72) Inventor: Cesare Cucchi, Bussero (IT)

(73) Assignee: CUCCHI GIOVANNI & C. S.R.L. (IT)

( * ) Notice: Subject to any disclaimer, the term of this patent is extended or adjusted under 35 U.S.C. 154(b) by 636 days.

(21) Appl. No.: 17/616,389

(22) PCT Filed: Jun. 3, 2020

(86) PCT No.: PCT/IB2020/055237
§ 371 (c)(1),
(2) Date: Dec. 3, 2021

(87) PCT Pub. No.: WO2020/245741
PCT Pub. Date: Dec. 10, 2020

(65) Prior Publication Data
US 2022/0258250 A1 Aug. 18, 2022

(30) Foreign Application Priority Data
Jun. 4, 2019 (IT) .................. 102019000008016

(51) Int. Cl.
*B23B 13/12* (2006.01)
*B23B 13/02* (2006.01)

(52) U.S. Cl.
CPC ............ *B23B 13/126* (2013.01); *B23B 13/02* (2013.01)

(58) Field of Classification Search
CPC ...... B23B 13/126; B23B 13/129; B23B 13/02
USPC ......................................................... 193/38
See application file for complete search history.

(56) References Cited

U.S. PATENT DOCUMENTS

| | | | | |
|---|---|---|---|---|
| 4,030,585 A | * | 6/1977 | Ducanis | B23B 13/04 |
| | | | | 193/38 |
| 5,113,730 A | * | 5/1992 | Ducanis | B23B 13/126 |
| | | | | 82/162 |
| 2023/0405745 A1 | * | 12/2023 | Cucchi | B23B 13/125 |

FOREIGN PATENT DOCUMENTS

| | | |
|---|---|---|
| CH | 647968 A5 | 2/1985 |
| EP | 0213659 B1 | 1/1990 |
| EP | 0485902 A1 | 5/1992 |
| EP | 0689890 A1 | 1/1996 |
| EP | 1669145 A1 | 5/2006 |
| FR | 1258838 | 10/1959 |

(Continued)

OTHER PUBLICATIONS

CN10408432 (Year: 2014).*
DE4137071 (Year: 1991).*

*Primary Examiner* — Gene O Crawford
*Assistant Examiner* — Lester Rushin, III
(74) *Attorney, Agent, or Firm* — Laubscher & Fretwell, P.C.

(57) ABSTRACT

Centring device for centring bars, tubes or similar to supply to a spindle of a machine tool, includes:
a support base body, along which a through opening is obtained for the passage of the bar,
oblong centring elements, connected rotatably to the support base body and arranged circumferentially with respect thereto to maintain the bar axially aligned on the spindle of the machine tool,
an elastic element arranged for urging elastically the oblong centring elements to a radial collecting and contraction position in which they are in mutual proximity.

9 Claims, 4 Drawing Sheets

(56) References Cited

FOREIGN PATENT DOCUMENTS

| IT | 1120340 B | 3/1986 |
| IT | BO20040732 A1 | 2/2005 |
| WO | 2014057556 A1 | 4/2014 |

* cited by examiner

CENTERING DEVICE FOR SUPPLYING BARS TO MACHINE TOOLS

CROSS-REFERENCE TO RELATED APPLICATIONS

This application claims priority of PCT/IB2020/055237, filed Jun. 3, 2020. Application No. PCT/IB2020/055237 claims priority of IT102019000008016, filed Jun. 4, 2019. The entire content of these applications is incorporated herein by reference.

BACKGROUND OF THE INVENTION

The present invention relates to a centring device for guiding and maintaining in an axially correct position bars, tubes or similar, during supplying to machine tools.

BRIEF DESCRIPTION OF THE PRIOR ART

In the sector of machine tools, such as in particular single spindle or multiple spindle lathes, the use is known of various centring devices the function of which is to attempt to reduce oscillations and correct the positioning of semi-finished metal products of elongated shape such as bars, tubes, etc.

Some examples of such devices are known from EP0213659 and EP0485902, in the name of this applicant.

Modern machine tools, in particular lathes for machining bars and the like, work at very high rotation speeds, which may reach values of the order of ten thousand rpm or even more. In the light of this feature, it emerges that current centring devices do not prove to be particularly effective in their action of guiding and maintaining in an axially aligned position the bars that, during supplying, rotate around their own longitudinal axis.

In other words, the static centring action supplied by the aforesaid known devices appears to be very modest and insufficient to counteract the great stress to which the bar is subjected because of small irregularities or flexure of the bar.

Inappropriate guiding and centring action is the cause of the knocking of the bar and often results in surface damage to the bar, in addition to causing high levels of wear and noise in the supply system.

Another centring device, known from EP0689890, in the name of the applicant, includes a rotating annular guiding element that is idle and angularly orientable with respect to the bar.

The annular guiding element is pushed to adhere to the bar in diametrically opposite points, by orienting the annular guiding element by suitable actuators, and is dragged rotatingly, exerting on the bar a dynamic centring action.

A similar centring device enables the problems of wear and the noise caused by knocking of the bars to be significantly reduced, owing to the dynamic centring action on the bar, however, the construction is rather complex and requires a connection to a supply source that is suitable for enabling the actuators of the device to operate.

Further, it is necessary to adjust each time the angular orientation of the annular guide element according to the diameter of the bars to be centred, which thus involves an intervention by an operator.

Centring devices are also present that have fixed elastic plates cantilevered on an annular support body; these devices, although they have a sufficiently simple structural configuration, are unable to overcome satisfactorily the problem of noise, surface damage to the bars, and further do not permit suitable adjustment of the pressure force with which the plates act on the bar being supplied.

In the light of what has been described above, there is ample room for improvement of bar-centring systems.

BRIEF DESCRIPTION OF THE INVENTION

The main object of the present invention is to overcome the limits that are inherent in known centring systems.

Another object is to provide a centring device that is at the same time structurally simple and functionally effective and reliable, able to reduce noticeably, owing to the damping action, the noise and the risk of surface damage to the advancing bars.

Another object is to provide an operationally and constructionally cheap technical solution, and which is also very versatile, i.e. it is able to guide and centre bars of different diameters without the need to make adjustments to the device, also enabling bars of very small diameters to be centred.

A further object of the present invention is to provide a centring device that is easy to fit to any already existing bar supplying equipment, thus reducing costs and assembly time.

BRIEF DESCRIPTION OF THE DRAWINGS

These and further features according to the present invention will be clearer from the description that follows with reference to the attached drawings, in which.

DETAILED DESCRIPTION OF THE INVENTION

With reference to the attached Figures, a centring device (1; 101; 201; 1A, 1B, 1C, 1D) for centring bars 2, tubes or similar to be supplied to a spindle of a machine tool, such as a lathe, is shown. The centring device according to the invention is configured for guiding and maintaining the bars or tubes aligned on the machining axis of the machine tool, adapting to bars or tubes of different diameters.

For the purposes of this description, the term "bar" means any elongated linear element, with a circular, or polygonal, full or tubular section.

Below, a first embodiment of the centring device 1 is disclosed, with reference to FIGS. 1 and 2.

For the other embodiments, shown in FIGS. 2 to 10, the description will be limited only to the differences with respect to the first embodiment.

For similar parts or parts common to various embodiments, the same reference numbers will be used or numbers increased by 100 or 200 or numbers with the addition of letters.

Figure 1:
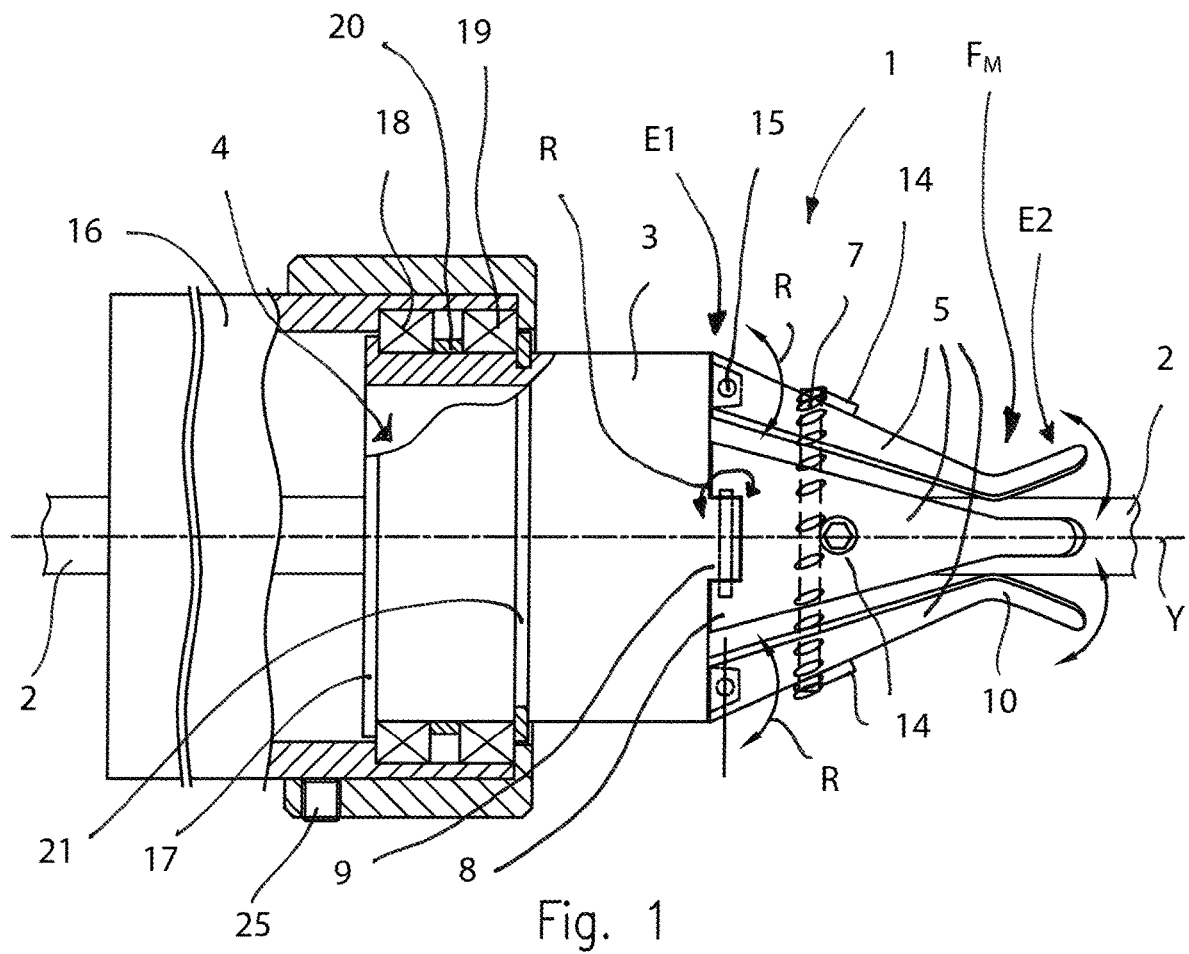
FIG. 1 is a partially sectioned side view of a first embodiment of a centring device for bars according to the present invention.
Figure 2:
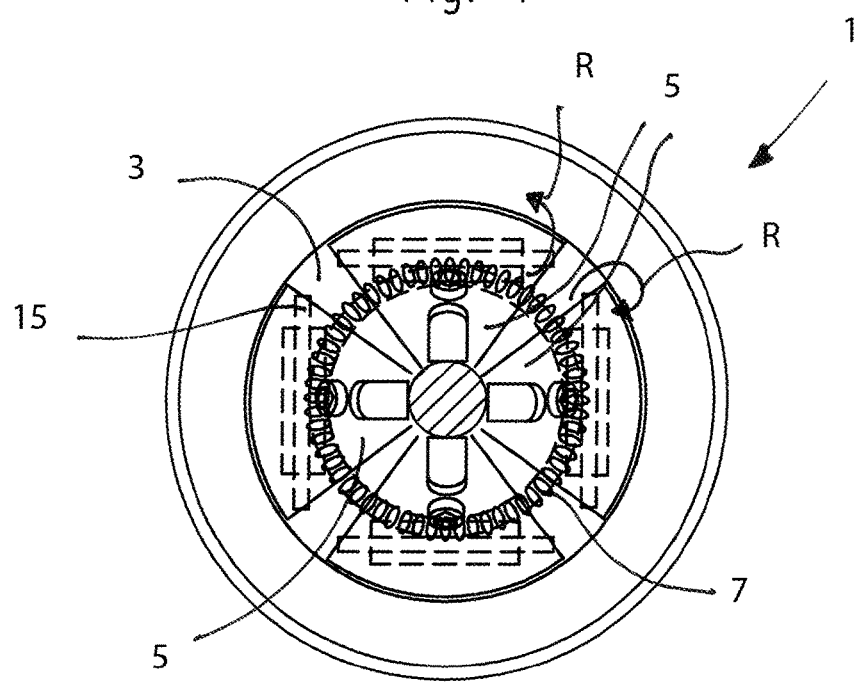
FIG. 2 is a frontal view of the centring device of FIG. 1.
Figure 3:
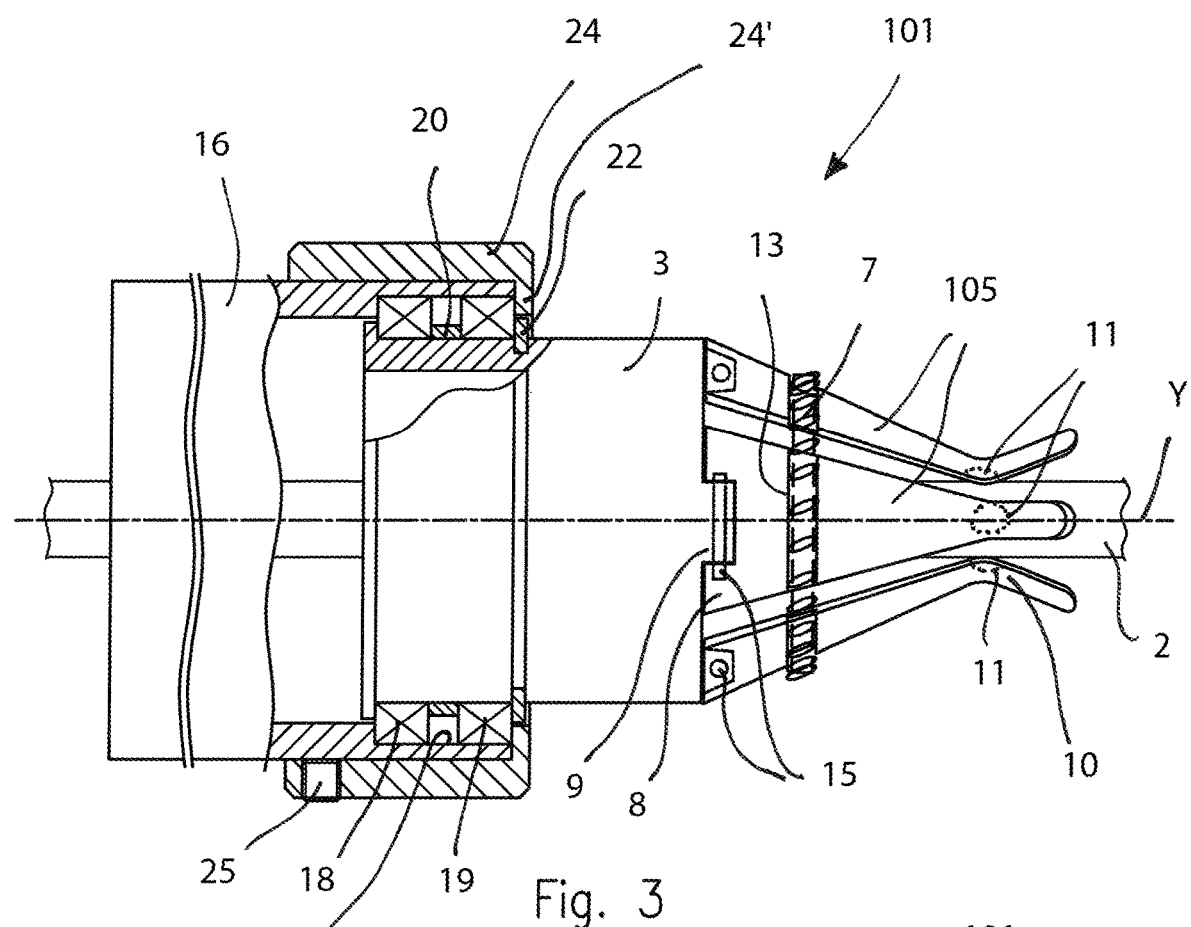
FIG. 3 is a partially sectioned side view of a second embodiment of a centring device for bars according to the present invention.
Figure 4:
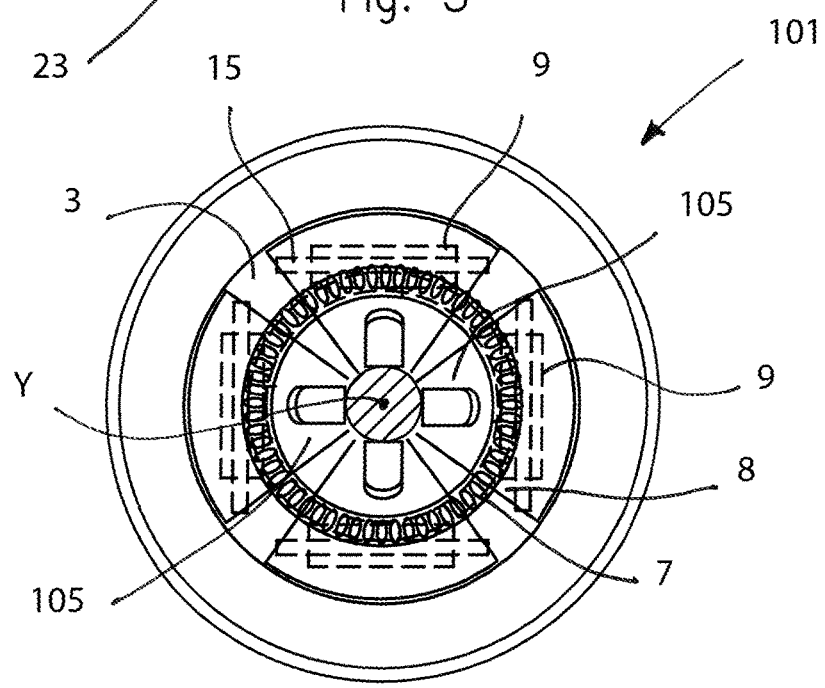
FIG. 4 is a frontal view of the centring device of FIG. 3.

With reference to the first embodiment specified in FIGS. 1 and 2, the centring device 1 includes a support base body 3, along which a through opening 4 is obtained for the passage of the bar 2, which is aligned on a respective spindle of the machine tool.

The support base body 3 can be in particular shaped as a guide tubular member for the bars 2, being part of supplying equipment that is not shown, or can consist of a hub fixed to a plate or a cradle, or as a support fixed to a guide carriage of different bar-supplying equipment, or as any other suitable support element.

The centring device 1 includes a plurality of oblong centring elements 5, connected rotatably to the aforesaid support base body 3 and arranged circumferentially with respect thereto.

Each oblong centring element 5 includes, at a first end E1, a connecting portion 8 hinged on a corresponding coupling portion 9 obtained on the support base body 3.

In particular, the coupling portion 9 is defined by a protrusion zone that couples, in a complementary manner, with a recess zone obtained on the connecting portion 8 of the respective oblong centring element 5.

A hinge pin 15 is provided that connects together the connecting portion 8 and the coupling portion 9, permitting the corresponding rotation thereof at the same time.

Each oblong centring element 5 is thus able to rotate, as indicated by the arrows R, around the respective hinge pin 15.

The oblong centring elements 5 in particular are defined by finger elements 5. The finger elements 5 have a tapered shape, in particular they have a cross section that decreases from the first end E1 nearer the support base body 3.

The oblong centring elements 5, or finger oblong centring elements are arranged for coming into contact with the surface of the bar 2 and exerting thereupon the guiding action in a direction axially aligned on the spindle of the machine tool.

The centring device 1 includes an elastic element 7 arranged for urging elastically the finger elements 5 to a reciprocal collecting position. In other words, owing to the elastic element 7, the finger elements 5 tend to arrange themselves in a radial contraction configuration in which they are near one another. The elastic element 7 then acts to urge the finger elements 5 to the longitudinal axis Y of the support base body 3. In particular, in the mutually contracted position, the finger elements 5 are tilted and converge towards the longitudinal axis Y.

In one embodiment, the elastic element includes a toroidal elastic element 7 wound around the finger centring elements 5.

The toroidal elastic element 7 can be an elastic strip or an annular coil spring or another equivalent shape.

In the first embodiment of FIGS. 1 and 2, the spring 7 is retained in position coupled with the finger elements 5 by retaining protruding elements 14.

The protruding elements, in particular, include screw elements 14 screwed to the finger elements 5, the head of which acts as a resting and retaining element for the toroidal elastic element 7.

According to another embodiment (embodiments of FIGS. 3 and 5), the elastic element 7 is housed inside an annular groove 13 obtained on the outer surface of the finger elements 5.

Owing to the aforesaid configuration, in particular owing to the elastic element 7 made distinctly with respect to the oblong centring elements 5, it is possible to adjust the intensity of the pressure exerted by the elements 5 on the bar 2. It is sufficient to replace the elastic element 7 with another having the desired mechanical features to adapt to a specific configuration of a bar to be supplied.

Each oblong centring element 5 includes, at a second end E2 that is free and is opposite the aforesaid first end E1, a contact portion 10 that is suitable for coming into contact with the bar 2 to exert on the bar 2 the guiding and centring action.

The finger centring elements 5 can be provided with friction reducing members $F_M$, configured for reducing the friction and facilitating the corresponding sliding of the bar 2 with respect thereto.

In one embodiment, the friction reducing members $F_M$ include an insert 11 (visible in 3) obtained on the contact portion 10. The insert 11, for example made of anti-adherent material with a low friction coefficient (for example polytetrafluoroethylene or another suitable anti-friction material), is intended to come into contact with the bar 2, facilitating the sliding thereof with respect to the corresponding finger element 5.

Figure 5:
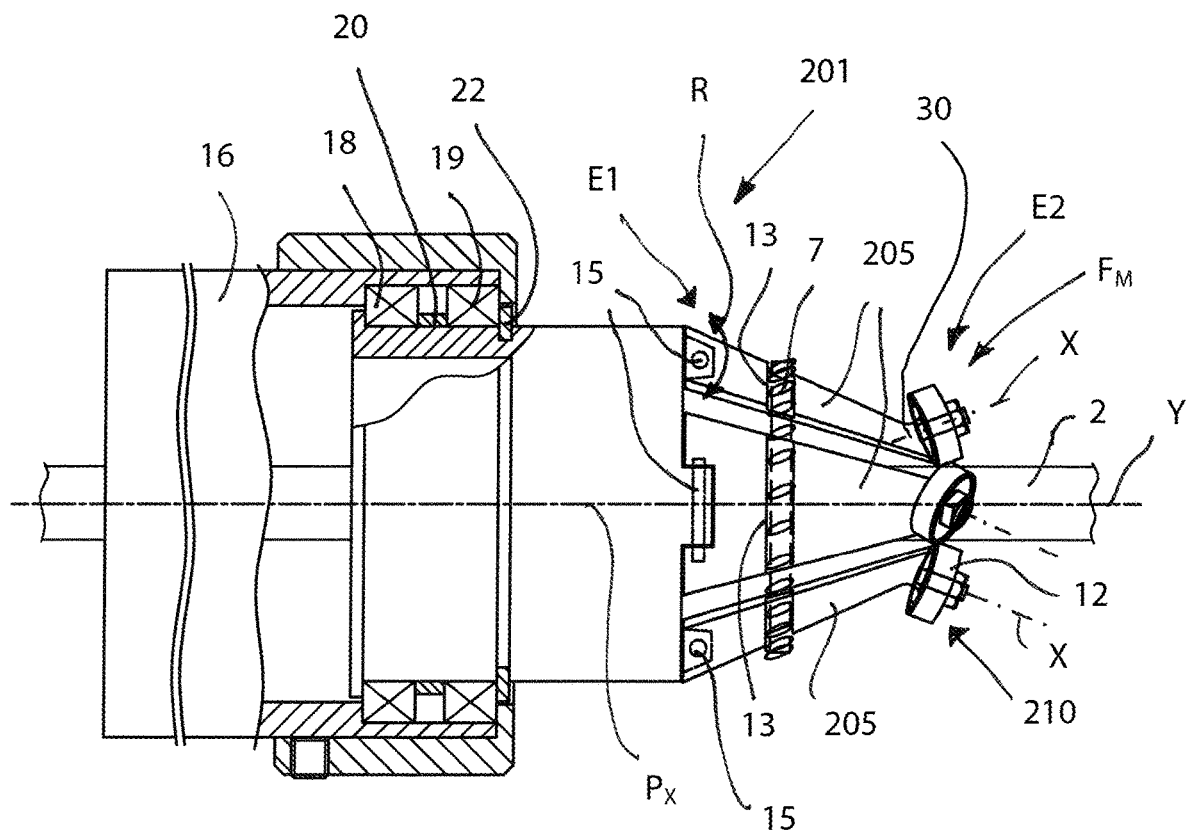
FIG. 5 is a partially sectioned side view of a third embodiment of a centring device for bars according to the present invention.
Figure 6:
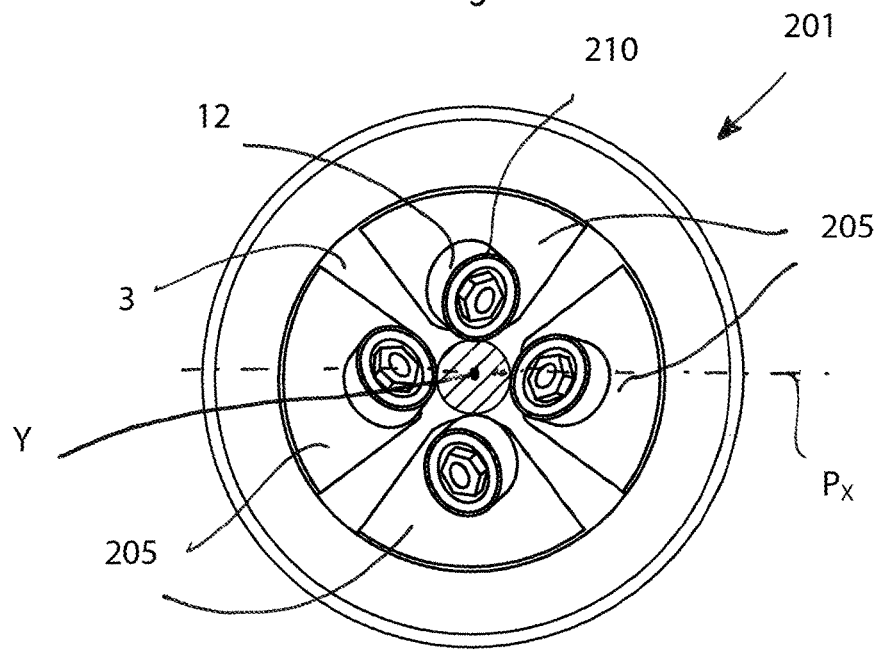
FIG. 6 is a frontal view of the centring device of FIG. 5.

In another embodiment shown in FIGS. 5 and 6, the friction reducing members $F_M$ include revolving members 12.

In particular, the revolving members include, for each finger element 5, a revolving bearing 12, the rotation axis X of which is tilted with respect to an axial plane Px of the support base body 3.

The revolving bearings 12 are supported rotatably on respective shank protrusions 30 that are projected by the respective oblong centring elements 5.

These shank protrusions 30 are connected to the respective oblong centring elements 5 in an adjustable manner by suitable fixing elements, so as to enable, by loosening the latter, the orientation of the respective axes X to be varied. In this manner, the position and tilt of the revolving bearings 12 can be chosen in a desired manner in function of specific needs and on the basis of the geometry of the semifinished products (e.g. bars) to be guided in supplying the machine tool.

Owing to this particular tilted arrangement, the revolving bearings 12 are able to exert an effective centring and guiding action, reducing at the same time considerably the friction due to the corresponding movement of the bar 2 with respect to the contact portions 201 of the finger elements 5.

The number of finger elements or oblong centring elements can be chosen according to specific needs.

Figures 7, 8:
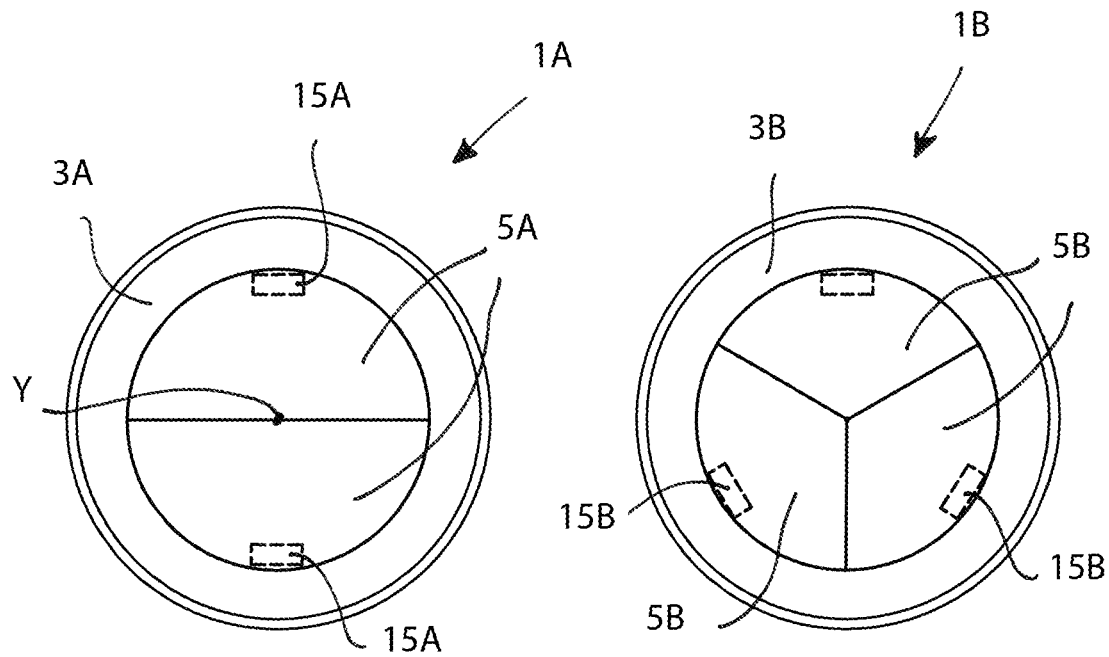
FIGS. 7 to 10 show schematically, in a frontal view, different possible embodiments of the centring device according to the invention.

For example, as shown in FIG. 7, two finger elements 5A can be provided for the centring device 1A according to the invention.

In FIG. 8 an embodiment of a centring device 1B is schematized that has three finger elements 5B.

Figures 9, 10:
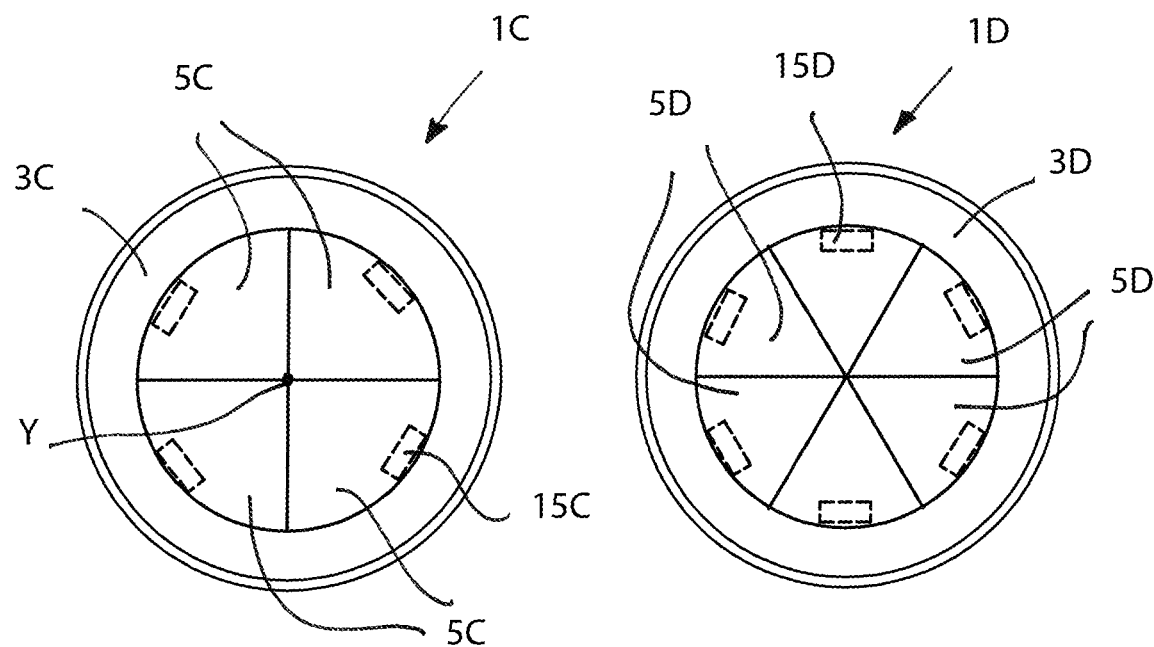

In FIG. 9 an embodiment of a centring device 1C is schematized that has four finger elements 5C.

In FIG. 10 an embodiment of a centring device 1D is schematized that has six finger elements 5D.

Embodiments are possible with a greater number of finger centring elements, according to the shape of the section of the bars 2.

All the embodiments disclosed above, with reference to FIGS. 1 to 10, have a similar structural conformation of the support base body 3, in particular of the part thereof for coupling with a supplying machine.

The support base body 3 is configured for supporting and guiding the rotating bars by adapting instantly to the angular speed variations of the spindle of the machine tool.

Precisely, the support base body 3 is supported rotatably by a cylindrical element 16, the cylindrical element 16 on the other hand being supported by the supplying equipment in a non-rotatable manner around the axis thereof.

In this manner, the rotation inertia of the centring device 1 is reduced significantly with respect to previously known solutions, thus improving the precision of the machining tasks performed on the bars 2.

The relative rotation between the base body 3 and cylindrical element 11 is achieved by interposing suitable rolling elements therebetween.

More precisely, a rear end of the support base body 3 includes, facing a direction opposite the spindle of the machine tool, an annular shoulder 17 against which a first ball bearing 18 is positioned that is inserted on the support base body 3 from the front end opposite the annular shoulder 17.

On the support base body 3 a second ball bearing 19 is provided and inserted, appropriately spaced apart from the first bearing 18 by a spacer 20, so as to ensure stability for the centring device 1.

In front of the second ball bearing 19, the support base body 3 includes an annular recess 21 into which an elastic ring 22 of Seeger circlip ring type is inserted to hold in position the two bearings 18, 19 and the spacer 20.

The support base body 3 is fixed removably to the cylindrical element 16 of the centring device 1.

In particular, the front end of the cylindrical element 16 is provided with an annular inner coupling seat 23 in which the bearings 18,19 that are provided on the base body 3 are inserted, when the base body 3 is fitted in the cylindrical element 16 of the device 1, 101, 201.

The support base body 3 is fixed removably to the cylindrical element 16, for example by an outer sleeve 24 including at a front end an inner annular edge 24' intended for coming into contact with the second bearing 19 placed in front on the base body 3.

The outer sleeve 24 is placed outside the base body 3 so that once the base body 3 outer sleeve 24 is fitted to the cylindrical element 16, the sleeve 24 is inserted into the cylindrical element 16, exerting by the inner edge 24' thereof a retaining action for the support base body 3 by acting on the bearing 19 placed in the front.

The outer sleeve 24 is fixed to the cylindrical element 16 for example by a series of grubscrews 25 inserted into suitable threaded holes provided in the sleeve 24, or by other fixing elements that is suitable for enabling the centring device 1 to be removed easily.

During operation, the finger elements 5, pushed forward by the bar 2, rotate by the suitable amount around the respective hinging zones, contrasting the return elastic action of the elastic element 7 and adapting to the section of the bar 2. The bar 2 is then moved forward by a rear bar-pushing element without any damage whereas at the same time the stress, that is generated during rotation, is damped. When the entire length of the bar has traversed the centring device 1, the finger elements 5 open further under the thrust of the rear bar-pushing element—which can generally have a greater cross section than the bar 2—to enable partial advancing thereof to the lathe.

From what has been said and shown in the attached drawings, it is clear that the centring device according to the invention achieves all the set objects.

In particular, the centring device according to the invention is at the same time structurally simple and functionally effective and reliable, able to reduce noticeably, owing to the damping action performed by the oblong centring elements, the noise and the risk of surface damage to the advancing bars.

The centring device according to the invention, of passive type, is operationally and constructionally cheap, and is also very versatile, adapting effectively to bars of various, also very reduced, diameters, without the need to make adjustments to the device.

The centring device according to the invention is easy to fit to any already existing bar supplying equipment, thus reducing costs and assembly time.

It is understood that what has been said and shown with reference to the attached drawings has been provided merely by way of example of the general features of the centring device; accordingly, other modifications or variations can be made to the device or parts thereof without thereby falling outside the scope of the claims.

In particular, the geometric conformation, dimensions, position, materials that make up one or more parts of the device 1 can be chosen and/or optimized on the basis of specific use requirements.

The invention claimed is:

1. A centring device for centring bars, tubes or similar to be supplied to a spindle of a machine tool, including:
    a support base body along which a through opening is obtained for the passage of the bar,
    oblong centring elements, which are connected rotatably to said support base body and arranged circumferentially thereto to maintain the bar axially aligned on the spindle of the machine tool,
    an elastic element arranged for urging elastically said oblong centring elements to a radial collecting and contraction position in which they are in mutual proximity, wherein
    each of said oblong centring elements is provided with friction reducing members including revolving members configured for facilitating the corresponding sliding of said bar with respect to the oblong centring element,
    said revolving members including at least one revolving bearing the rotation axis of which is tiltable, in an adjustable manner, with respect to an axial plane of said support base body, each revolving bearing being rotatably supported by a respective shank protrusion that projects from the respective oblong centring element, wherein
    said shank protrusion is connected to the respective oblong centring element in an adjustable manner by suitable fixing elements that, once loosened, enable the orientation of the respective axis to be varied, to select the position and tilt of the respective revolving bearing in a desired manner in function of specific needs and on the basis of the geometry of said bars, tubes or similar to guide to the machine tool.

2. The centring device according to claim 1, wherein each of said oblong centring elements includes, at a first end, a connecting portion hinged on a corresponding coupling portion obtained on said support base body.

3. The centring device according to claim 2, wherein each of said oblong centring elements includes, at a second end that is free and opposite said first end, a contact portion that is suitable for coming into contact with said bar to exert thereupon the guiding and centring action.

4. The centring device according to claim 3, wherein said friction reducing members are obtained on said contact portion.

5. The centring device according to claim 4, wherein said friction reducing members include insert members made of anti-adherent material with a low friction coefficient, intended for coming into contact with said bar, facilitating the corresponding sliding thereof with respect to the oblong centring elements.

6. The centring device according to claim 1, wherein said elastic element includes a toroidal elastic element wound around said oblong centring elements and configured for urging said oblong centring elements against one another to a longitudinal axis of said support base body.

7. The centring device according to claim 6, wherein on said oblong centring elements there are obtained housing grooves that define an annular seat for said toroidal elastic element.

8. The centring device according to claim 6, wherein on said oblong centring elements there is provided retaining protruding elements for retaining said toroidal elastic element in a position coupled with said oblong centring elements.

9. The centring device according to claim 8, wherein said protruding elements include screw elements screwed to said oblong centring elements, the head of each of said screw elements acting as a supporting and retaining element for said toroidal elastic element.

\* \* \* \* \*